UNITED STATES PATENT OFFICE.

PAUL VOLKMANN, OF LEVERKUSEN, NEAR COLOGNE, GERMANY, ASSIGNOR TO SYNTHETIC PATENTS CO., INC., OF NEW YORK, N. Y., A CORPORATION OF NEW YORK.

YELLOW AZO DYESTUFFS.

1,098,600.  Specification of Letters Patent.  Patented June 2, 1914.

No Drawing.   Application filed August 7, 1913.   Serial No 783,541.

*To all whom it may concern:*

Be it known that I, PAUL VOLKMANN, doctor of philosophy, chemist, citizen of the German Empire, residing at Leverkusen, near Cologne, Germany, have invented new and useful Improvements in Yellow Azo Dyestuffs, of which the following is a specification.

My invention relates to the manufacture and production of new yellow azo dyes which can be obtained by either combining the diazo compounds of toluidin compounds, such as ortho-toluidin, para-toluidin, 2-toluidin-5-sulfonic acid, 4-toluidin-3-sulfonic acid with 2-chloroarylmethylpyrazolone sulfonic acids, such as 2-chloro-phenylmethylpyrazolone-4- or 5-sulfonic acid or with aceto-acetic acid ester and condensing the resulting compounds with 2-chloroarylhydrazin sulfonic acids.

The new coloring matters dye wool from an acid bath in greenish-yellow level pure shades characterized by their good fastness to light. The dyes have in a free state most probably the formula:

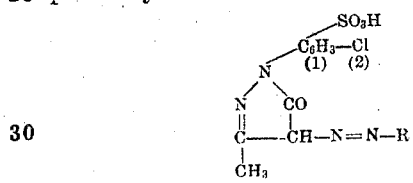

(R meaning the radical of a toluene compound). They are after being dried and pulverized yellow powders soluble in water and in concentrated sulfuric acid with a yellow coloration. They yield upon reduction with stannous chlorid and hydrochloric acid a toluidin compound and 2-chloro-sulfophenyl-3-methyl-4-amino-5-pyrazolone.

To illustrate my process, I can proceed as follows, the parts being by weight:—187 parts of 2-toluidin-5-sulfonic acid are diazotized with 69 parts of sodium nitrite and 240 parts of sulfuric acid of 40° Bé. and the diazo compound is combined with 130 parts of aceto-acetic-ester.

in the presence of 110 parts of $CaCO_3$. The copulation completed 22 parts of sodium carbonate are added and the mixture is filtered from $CaSO_4$ and $CaCO_3$. The resulting solution is then added to a suspension of 222.5 parts of 2-chloro-phenylhydrazin-4-sulfonic acid in 3500 parts of water containing 35 parts of sodium carbonate and 116 parts of sodium acetate. The mixture is heated to 95° C. during 3 hours, acidulated with 70 parts of hydrochloric acid of 19.5° Bé. and the dye is salted out from the hot mixture. It has the formula:

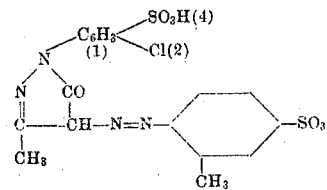

and is in the shape of its sodium salt a yellow powder soluble in concentrated sulfuric acid with a yellow coloration. Upon reduction with stannous chlorid and hydrochloric acid the dye is decomposed, 2-toluidin-5-sulfonic acid and 2-chloro-4-sulfophenyl-3-methyl-4-amino-5-pyrazolone are obtained. It produces on wool bright greenish-yellow level shades fast to light.

I claim:—

1. The new azo dyes derivable from a diazotized toluidin compound and a 2-chlorophenyl-sulfo-methylpyrazolone having in a free state most probably the formula:

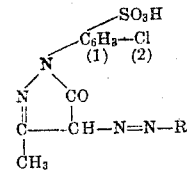

in which R represents the toluene radical of the diazotized toluidin compound, which dyes are after being dried and pulverized powders soluble in water and in concentrated sulfuric acid with a yellow coloration; yielding upon reduction with stannous chlorid and hydrochloric acid a toluidin compound and 2-chloro-sulfophenyl-3-methyl-4-amino-5-pyrazolone; and dyeing wool from an acid bath in greenish-yellow level pure shades characterized by a good fastness to light, substantially as described.

2. The new azo dye derivable from diazotized 2-toluidin-5-sulfonic acid and 2- chloro-4-sulfophenyl-3-methyl-5-pyrazolone of the following formula:

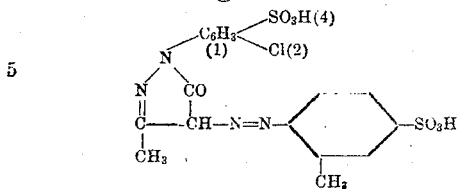

which dye is after being dried and pulverized in the shape of its sodium salt a yellowish powder soluble in concentrated sulfuric acid with a yellow color; yielding upon reduction with stannous chlorid and hydrochloric acid 2-toluidin-5-sulfonic acid and 2-chloro-4-sulfophenyl-3-methyl-4-amino-5-pyrazolone; and dyeing wool bright greenish-yellow level shades fast to light, substantially as described.

In testimony whereof I have hereunto set my hand in the presence of two subscribing witnesses.

PAUL VOLKMANN. [L. S.]

Witnesses:
HELEN NUFER,
ALBERT NUFER.